(12) United States Patent
Shibazaki

(10) Patent No.: US 9,383,603 B1
(45) Date of Patent: Jul. 5, 2016

(54) TRANSFLECTIVE LIQUID-CRYSTAL DISPLAY

(71) Applicant: InnoLux Corporation, Miao-Li County (TW)

(72) Inventor: Minoru Shibazaki, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/608,574

(22) Filed: Jan. 29, 2015

(51) Int. Cl.
*G02F 1/1335* (2006.01)
*G02F 1/1343* (2006.01)
*G02F 1/1337* (2006.01)

(52) U.S. Cl.
CPC ...... *G02F 1/133555* (2013.01); *G02F 1/13439* (2013.01); *G02F 1/133512* (2013.01); *G02F 1/133514* (2013.01); *G02F 1/133707* (2013.01)

(58) Field of Classification Search
CPC .................................................. G02F 1/133555
USPC .......................................................... 349/114
See application file for complete search history.

(56) References Cited

U.S. PATENT DOCUMENTS

2009/0002611 A1* 1/2009 Jiang ................. G02F 1/133707 349/114

* cited by examiner

*Primary Examiner* — Phu Vu
(74) *Attorney, Agent, or Firm* — McClure, Qualey & Rodack, LLP

(57) ABSTRACT

A transflective liquid-crystal display is provided, including a liquid-crystal layer, a first substrate and a second substrate. The liquid-crystal layer is sandwiched between the first and second substrates to define an array of pixels on the second substrate. Each pixel includes a reflective area, a transmissive area and a pixel electrode. The transmissive area is adjacent to the reflective area. The pixel electrode is disposed on the second substrate and electrical connecting to a data line, wherein the pixel electrode is only formed reflective electrode in the reflective area and has reflectivity.

18 Claims, 6 Drawing Sheets

US 9,383,603 B1

TRANSFLECTIVE LIQUID-CRYSTAL DISPLAY

BACKGROUND OF THE INVENTION

1. Field of the Invention

The present invention relates to a liquid-crystal display, and in particular to a transflective liquid-crystal display.

2. Description of the Related Art

According to different designs of light sources, liquid-crystal display panels may be divided into three categories: transmissive liquid-crystal display panels, reflective liquid-crystal display panels, and transflective liquid-crystal display panels. Combining the advantages of the transmissive liquid-crystal display panel and the reflective liquid-crystal display panel, the display quality of the transflective liquid-crystal display panel may be ensured in indoor environments as well as outdoor environments with strong ambient light.

In a conventional transflective liquid-crystal display, a cell gap modification layer is disposed on an upper transparent layer in a reflective area thereof to adjust a cell gap of the reflective area. The cell gap of the reflective area and a cell gap of a transmissive area are different. For example, when the cell gap of the transmissive area is $\lambda/2$, the cell gap of the reflective area is $\lambda/4$, and the light emitted from the transmissive area has the same phase as the light emitted from the reflective area to maintain illumination uniformity, wherein $\lambda$ is the wavelength of the light provided by the transflective liquid-crystal display. However, the cell gap modification layer increases the cost of the transflective liquid-crystal display.

Additionally, the edge of the cell gap modification layer influences the arrangement of the liquid-crystal molecules, and light leakage occurs at the edge of the cell gap modification layer. Conventionally, a shielding layer is formed between the reflective area and the transmissive area to prevent the light leakage. However, the shielding layer decreases the aperture ratio of the transflective liquid-crystal display.

BRIEF SUMMARY OF THE INVENTION

In one embodiment of the invention, a transflective liquid-crystal display is provided, including a liquid-crystal layer, a first substrate and a second substrate. The liquid-crystal layer is sandwiched between the first and second substrates to define an array of pixels on the second substrate. Each pixel includes a reflective area, a transmissive area and a pixel electrode. The transmissive area is adjacent to the reflective area. The pixel electrode is disposed on the second substrate and electrical connecting to a data line, wherein the pixel electrode is only formed reflective electrode in the reflective area and has reflectivity.

In one embodiment of the invention, there is no cell gap modification layer disposed on the transparent electrode in the reflective area. In one embodiment, there is no electrode disposed on the second substrate in the first and second sub-regions, and a plurality of liquid-crystal molecules of the liquid-crystal layer in the first and second sub-regions is arranged by a fringe electric field of the pixel electrode. Utilizing the embodiment of the invention, there is no cell gap modification layer, the arrangement of the liquid-crystal molecules are not influenced by the cell gap modification layer, and the light leakage problem is prevented. Therefore, a sum of a width of the first sub-region and a width of the second sub-region is increased to 10 μm-20 μm, and the aperture ratio of the transflective liquid-crystal display is increased. The illumination of the transmissive area (first sub-region and second sub-region) of the embodiment of the invention is double of the illumination of the transmissive area of the conventional art, and the illumination uniformity is maintained even though the cell gap of the reflective area and the cell gap of the first and second sub-regions are almost the same.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
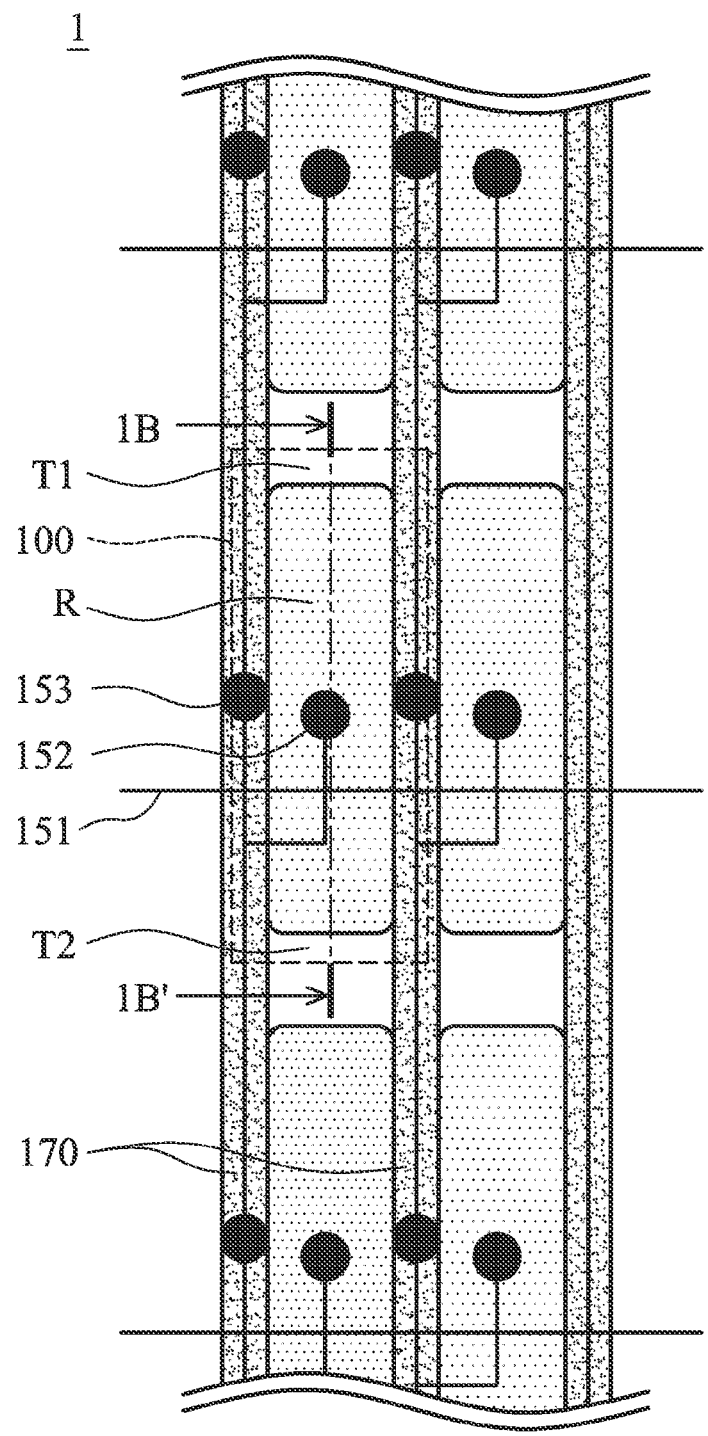
FIG. 1A is a top view of a transflective liquid-crystal display of a first embodiment of the invention.
Figure 1B:
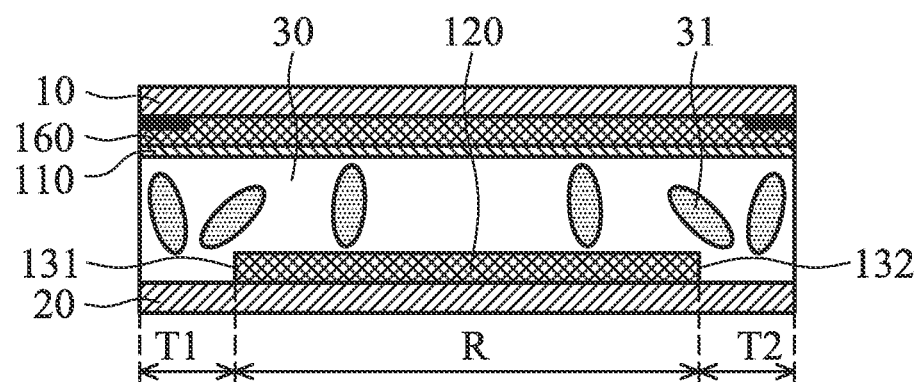
FIG. 1B is a cross sectional view along 1B-1B' direction of FIG. 1A.

FIGS. 1A and 1B show a transflective liquid-crystal display 1 of a first embodiment of the invention. The transflective liquid-crystal display 1 comprises a liquid-crystal layer 30, a first substrate 10 and a second substrate 20. The liquid-crystal layer 30 is sandwiched between the first substrate 10 and the second substrate 20, to define an array of pixels 100 on the second substrate 20. Each pixel 100 comprises a reflective area R, a transmissive area, a transparent electrode (common electrode) 110 and a pixel electrode 120. The reflective area surrounds the transmissive area The transmissive area includes two sub-region (first sub-region T1 and second sub-region T2) arranged in two opposite side of the reflective area pixel electrode. The reflective area R comprises a first side 131 and a second side 132. The first sub-region T1 is adjacent to the first side 131 of the reflective area R. The second sub-region T2 is adjacent to the second side 132 of the reflective area R. The transparent electrode 110 is disposed on the first substrate 10. The pixel electrode 120 is disposed on the second substrate 20, wherein the pixel electrode 120 is disposed in the reflective area R.

In the first embodiment of the invention, there is no cell gap modification layer disposed on the transparent electrode 110 in the reflective area R. In one embodiment, there is no electrode disposed on the second substrate 20 in the first and second sub-regions T1/T2, and a plurality of liquid-crystal molecules 31 of the liquid-crystal layer in the first and second sub-regions T1/T2 are arranged by a fringe electric field of the pixel electrode 120. Utilizing the embodiment of the invention, there is no cell gap modification layer, the arrangement of the liquid-crystal molecules would not be influenced by the cell gap modification layer, and the light leakage problem is prevented. Therefore, a ratio between an square measure of the transmissive area and an square measure of the reflective area is smaller than 0.3, and the aperture ratio of the transflective liquid-crystal display is increased. The illumination of the transmissive area (first sub-region and second sub-region) of the embodiment of the invention is double of the illumination of the transmissive area of the conventional art, and the illumination uniformity is maintained even the cell gap of the reflective area R and the cell gap of the first and second sub-regions T1/T2 are almost the same (for example, the difference between the cell gap of the reflective area R and a cell gap of the first sub-region T1 is smaller than 1 μm).

In one embodiment of the invention, the cell gap of the reflective area is λ/8, wherein λ/4 is wavelength of the light provided by the transflective liquid-crystal display. In another embodiment of the invention, the cell gap of the reflective area is λ/2.

Figure 2C:
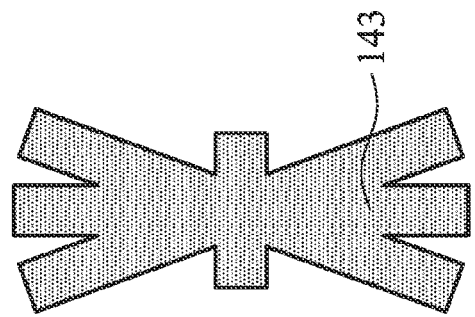
FIG. 2C shows a protruding structure of an embodiment of the invention.
Figure 2B:
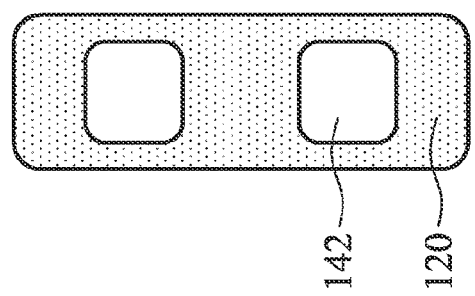
FIG. 2B shows slits of another embodiment of the invention.
Figure 2A:
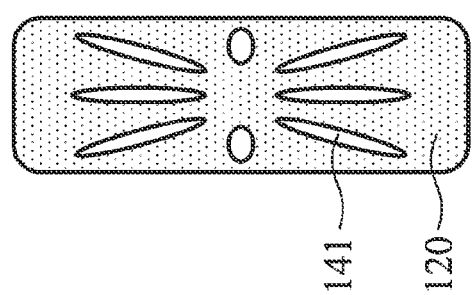
FIG. 2A shows slits of an embodiment of the invention.

In one embodiment of the invention, a plurality of slits are formed on the transparent electrode to arrange the liquid-crystal molecules of the liquid-crystal layer. In another embodiment of the invention, a plurality of slits are formed on the pixel electrode to arrange the liquid-crystal molecules of the liquid-crystal layer. For example, FIG. 2A shows slits 141 of an embodiment of the invention formed on the pixel electrode 120, and FIG. 2B shows slits 142 of another embodiment of the invention formed on the pixel electrode 120. In one embodiment of the invention, one or more protruding structure can be formed on the transparent electrode or the pixel electrode to arrange the liquid-crystal molecules of the liquid-crystal layer. For example, FIG. 2C shows a protruding structure 143 of an embodiment of the invention.

In one embodiment of the invention, the width of the reflective area R is greater than 100 μm.

Figure 3:
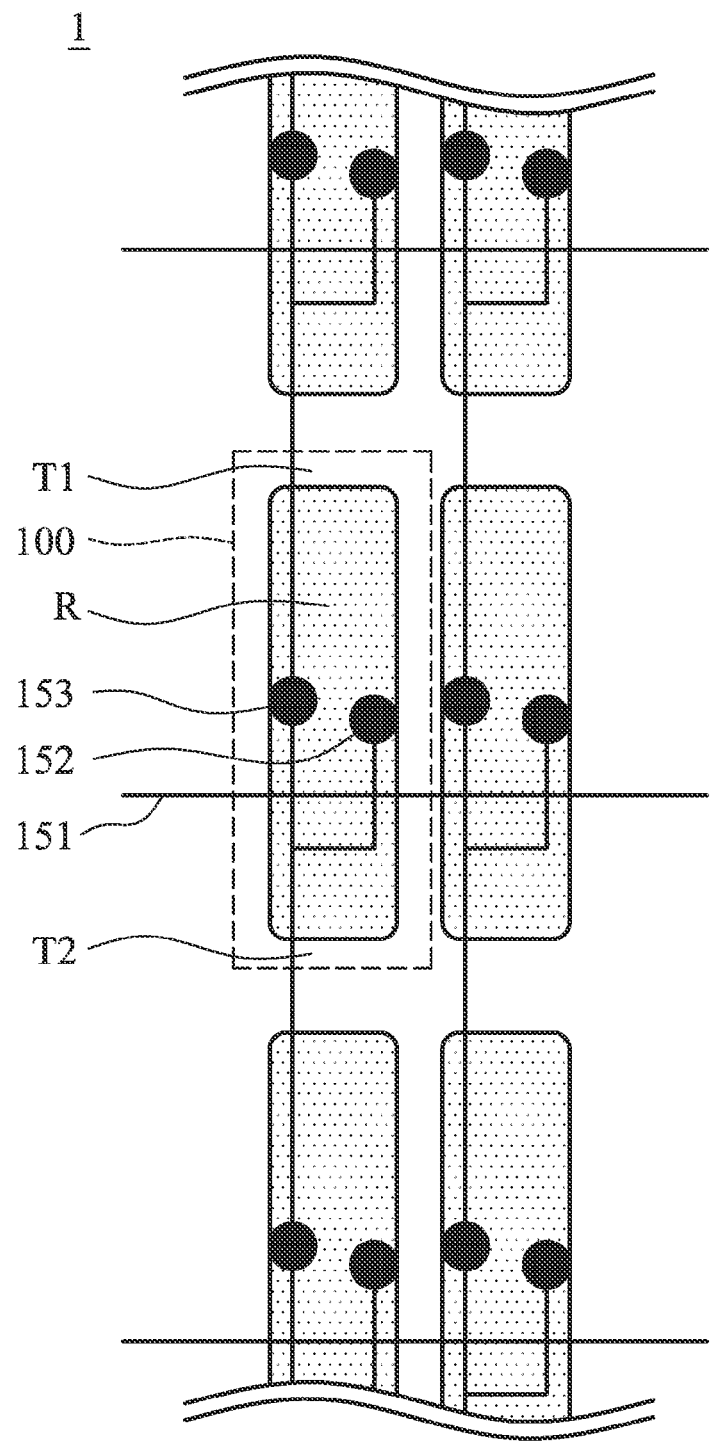
FIG. 3 shows a modified example of the first embodiment of the invention.

In one embodiment of the invention, the transflective liquid-crystal display further comprises scan lines 151, data lines 152 and contacts 153. With reference to FIGS. 1 and 3, the relative position of the contacts 153 and the pixel electrode 120 (or, the reflective area R) can be modified. In one embodiment, there is no light shielding layer formed on the scan lines 151.

With reference to FIG. 1A, in one embodiment, the transflective liquid-crystal display further comprises a light shielding layer 170 including a plurality of line pattern (170) disposed corresponding to the array of pixels 100, wherein the plurality of line pattern (170) are spaced at intervals in a direction and located at two sides of each pisel.

With reference to FIG. 1B, in one embodiment, the transflective liquid-crystal display further comprises a color filter 160, comprising photoresist patterns of different colors, the line pattern of the light shielding layer is only located between the photoresist patterns of two different colors.

Figure 4A:
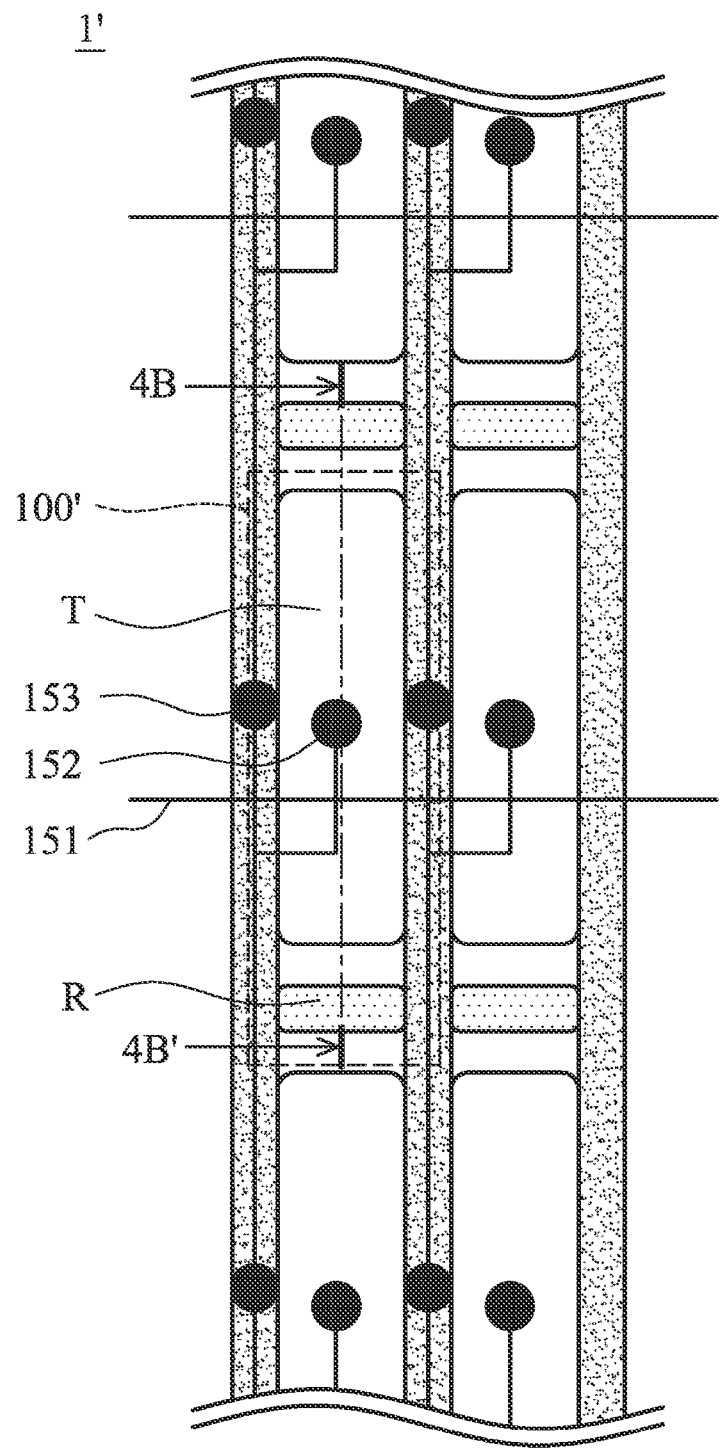
FIG. 4A is a top view of a transflective liquid-crystal display of a second embodiment of the invention.
Figure 4B:
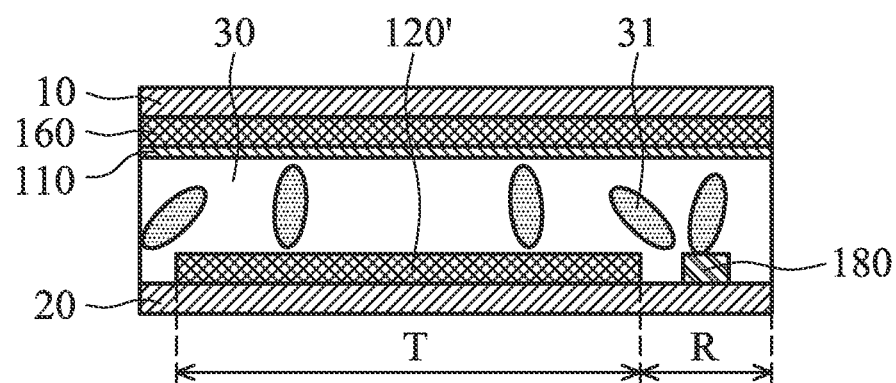
FIG. 4B is a cross sectional view along 4B-4B' direction of FIG. 4A.

FIGS. 4A and 4B shows a transflective liquid-crystal display of a second embodiment of the invention, comprising a liquid-crystal layer 30, a first substrate 10 and a second substrate 20. The liquid-crystal layer 20 is sandwiched between the first substrate 10 and the second substrate 20, to define an array of pixels 100' in the liquid-crystal layer 20. Each pixel 100' comprises a transmissive area T, a reflective area R, a transparent electrode (common electrode) 110 and a pixel electrode 120'. The transmissive area T comprises a first side 131' and a second side 132'. The reflective area R is adjacent to the first side 131' of the transmissive area T. The transparent electrode 110 is disposed on the first substrate 10. The pixel electrode 120' is disposed on the second substrate 20 in the transmissive area T. In the second embodiment, a reflector 180 is disposed on the second substrate 20 in the reflective area R. The reflector 180 is floating or connected to common voltage.

In one embodiment, a ratio between an square measure of the reflective area and an square measure of the transmissive area is smaller than 0.3. Similar to the first embodiment, there is no cell gap modification layer disposed on the transparent electrode 110 in the reflective area R, and the difference between a cell gap of the first reflective area and a cell gap of the transmissive area is smaller than 1 μm.

In the second embodiment, a plurality of liquid-crystal molecules of the liquid-crystal layer in the reflective area R are arranged by a fringe electric field of the pixel electrode 120'.

In one embodiment, the cell gap of the reflective area R is λ/4, wherein λ is wavelength of a light provided by the transflective liquid-crystal display. In another embodiment, the cell gap of the reflective area R is λ/2, wherein λ is wavelength of a light provided by the transflective liquid-crystal display.

Similar to the first embodiment, in a modified embodiment, a plurality of slits are formed on the transparent electrode 110 to arrange a plurality of liquid-crystal molecules of the liquid-crystal layer. In another modified embodiment a plurality of slits are formed on the pixel electrode 120' to arrange a plurality of liquid-crystal molecules of the liquid-crystal layer. The width of the transmissive area is greater than 100 μm. In the second embodiment, there is no light shielding layer formed between the reflective area R and the transmissive area T.

With reference to FIG. 4A, in one embodiment, the transflective liquid-crystal display further comprises a light shielding layer 170 including a plurality of line pattern (170) disposed corresponding to the array of pixels 100', wherein the plurality of line pattern (170) are spaced at intervals in a direction and located at two sides of each pisel.

With reference to FIG. 4B, in one embodiment, the transflective liquid-crystal display further comprises a color filter 160, comprising photoresist patterns of different colors, the line pattern of the light shielding layer is only located between the photoresist patterns of two different colors.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A transflective liquid-crystal display, comprising:
  a liquid-crystal layer;
  a first substrate; and
  a second substrate, wherein the liquid-crystal layer is sandwiched between the first and second substrates to define an array of pixels on the second substrate,
  wherein at least one of the pixels comprises:
    a reflective area;
    a transmissive area, adjacent to the reflective area;

a pixel electrode, disposed on the second substrate and electrical connecting to a data line, wherein the pixel electrode is only formed reflective electrode in the reflective area and has reflectivity.

2. The transflective liquid-crystal display as claimed in claim 1, wherein, a ratio between an square measure of the transmissive area and an square measure of the reflective area is smaller than 0.3.

3. The transflective liquid-crystal display as claimed in claim 1, wherein a difference between a cell gap of the reflective area and a cell gap of the first sub-region is smaller than 1 μm.

4. The transflective liquid-crystal display as claimed in claim 1, each pixel further comprises a common electrode on the first substrate to provide a common voltage, and the common electrode corresponds to the reflective area and transmissive area.

5. The transflective liquid-crystal display as claimed in claim 1, the reflective area surrounds the transmissive area.

6. The transflective liquid-crystal display as claimed in claim 1, the transmissive area includes two sub-region arranged in two opposite side of the reflective area pixel electrode.

7. The transflective liquid-crystal display as claimed in claim 1, further comprises a light shielding layer including a plurality of line pattern disposed corresponding to the array of pixels, wherein the plurality of line pattern are spaced at intervals in a direction and located at two sides of each pixel.

8. The transflective liquid-crystal display as claimed in claim 7, further comprising a color filter, comprising photoresist patterns of two different colors, the line pattern of the light shielding layer is only located between the photoresist patterns of two different colors.

9. The transflective liquid-crystal display as claimed in claim 1, wherein a plurality of slits are formed on the pixel electrode to arrange a plurality of liquid-crystal molecules of the liquid-crystal layer.

10. The transflective liquid-crystal display as claimed in claim 1, wherein there is no light shielding layer formed between the reflective area and the first sub-region.

11. A transflective liquid-crystal display, comprising:
    a liquid-crystal layer;
    a first substrate;
    a second substrate, wherein the liquid-crystal layer is sandwiched between the first and second substrates to define an array of pixels on the second substrate, wherein at least one of the pixel comprises:
    a transmissive area,
        a reflective area, adjacent to the transmissive area, wherein a reflector is disposed on the second substrate in the first reflective area, the reflector is floating or connected to common voltage;
        a pixel electrode, electrical connecting to a data line and only disposed on the second substrate in the transmissive area.

12. The transflective liquid-crystal display as claimed in claim 11, a ratio between an square measure of the reflective area and an square measure of the transmissive area is smaller than 0.3.

13. The transflective liquid-crystal display as claimed in claim 11, wherein a difference between a cell gap of the first reflective area and a cell gap of the transmissive area is smaller than 1 μm.

14. The transflective liquid-crystal display as claimed in claim 11, wherein each pixel further comprises a common electrode on the first substrate to provide a common voltage, and the common electrode corresponds to the reflective area and transmissive area.

15. The transflective liquid-crystal display as claimed in claim 11, further comprises a light shielding layer including a plurality of line pattern disposed corresponding to the array of pixels, wherein the plurality of line pattern are spaced at intervals in a direction and located at two sides of each pixel.

16. The transflective liquid-crystal display as claimed in claim 15, further comprising a color filter, comprising photoresist patterns of two different colors, the line pattern of the light shielding layer is only located between the photoresist patterns of two different colors.

17. The transflective liquid-crystal display as claimed in claim 11, wherein a plurality of slits are formed on the pixel electrode to arrange a plurality of liquid-crystal molecules of the liquid-crystal layer.

18. The transflective liquid-crystal display as claimed in claim 11, wherein there is no light shielding layer formed between the first reflective area and the transmissive area.

* * * * *